US010697799B2

(12) United States Patent
Anagawa et al.

(10) Patent No.: US 10,697,799 B2
(45) Date of Patent: *Jun. 30, 2020

(54) ANGLE SENSOR AND ANGLE SENSOR SYSTEM

(71) Applicant: TDK CORPORATION, Tokyo (JP)

(72) Inventors: Kenkichi Anagawa, Tokyo (JP); Shinichirou Mochizuki, Tokyo (JP); Hiraku Hirabayashi, Tokyo (JP); Kazuya Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,574

(22) Filed: Dec. 10, 2019

(65) Prior Publication Data

US 2020/0116527 A1 Apr. 16, 2020

Related U.S. Application Data

(63) Continuation of application No. 15/705,700, filed on Sep. 15, 2017, now Pat. No. 10,533,878.

(30) Foreign Application Priority Data

Sep. 28, 2016 (JP) ................................. 2016-189029

(51) Int. Cl.
*G01D 5/244* (2006.01)
*G01D 5/16* (2006.01)
*G01D 5/14* (2006.01)

(52) U.S. Cl.
CPC ............. *G01D 5/16* (2013.01); *G01D 5/145* (2013.01); *G01D 5/24485* (2013.01)

(58) Field of Classification Search
CPC ....... G01D 5/16; G01D 5/145; G01D 5/24485
See application file for complete search history.

(56) References Cited

U.S. PATENT DOCUMENTS

| 8,604,780 | B2 | 12/2013 | Saruki et al. | |
| 8,659,289 | B2 | 2/2014 | Saruki et al. | |
| 2012/0038359 | A1* | 2/2012 | Saruki | B82Y 25/00 |
| | | | | 324/252 |

OTHER PUBLICATIONS

Feb. 7, 2019 Office Action issued in U.S. Appl. No. 15/705,700.

* cited by examiner

*Primary Examiner* — David M. Gray
*Assistant Examiner* — Michael A Harrison
(74) *Attorney, Agent, or Firm* — Oliff PLC

(57) ABSTRACT

An angle sensor includes a plurality of composite magnetic field information generation units and an angle computing unit. The plurality of composite magnetic field information generation units detect, at a plurality of detection positions, a composite magnetic field of a magnetic field to be detected and a noise magnetic field other than the magnetic field to be detected, and thereby generate a plurality of pieces of composite magnetic field information including information on the direction of the composite magnetic field. The angle computing unit generates a detected angle value by performing an operation using the plurality of pieces of composite magnetic field information so that an error of the detected angle value caused by the noise magnetic field is made smaller than in the case where the detected angle value is generated on the basis of any and only one of the plurality of pieces of composite magnetic field information.

15 Claims, 9 Drawing Sheets

ANGLE SENSOR AND ANGLE SENSOR SYSTEM

This is a Continuation of application Ser. No. 15/705,700 filed Sep. 15, 2017, which in turn claims priority of Japanese Patent Application No. 2016-189029 filed Sep. 28, 2016. The disclosure of the prior applications is hereby incorporated by reference herein in its entirety.

BACKGROUND OF THE INVENTION

1. Field of the Invention

The present invention relates to an angle sensor and an angle sensor system for generating a detected angle value having a correspondence with an angle to be detected.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. An angle sensor system using a magnetic angle sensor is typically provided with a magnetic field generation unit for generating a magnetic field to be detected, the direction of which rotates in response to the rotation or linear movement of an object. The magnetic field generation unit is a magnet, for example. The angle to be detected by the magnetic angle sensor has a correspondence with an angle that the direction of the magnetic field to be detected at a reference position forms with respect to a reference direction.

Among known magnetic angle sensors is one that includes a plurality of detection circuits for generating a plurality of detection signals of different phases and generates a detected angle value by performing an operation using the plurality of detection signals, as disclosed in U.S. Pat. Nos. 8,604,780 B2 and 8,659,289 B2. Each of the plurality of detection circuits detects a magnetic field to be detected. Each of the plurality of detection circuits includes at least one magnetic detection element.

In some magnetic angle sensors, as described in U.S. Pat. Nos. 8,604,780 B2 and 8,659,289 B2, each detection circuit may be subjected to not only a magnetic field to be detected but also a noise magnetic field other than the magnetic field to be detected. Examples of the noise magnetic field include the earth's magnetic field and a leakage magnetic field from a motor. When subjected to such a noise magnetic field, each detection circuit detects a composite magnetic field of the magnetic field to be detected and the noise magnetic field. When the magnetic field to be detected and the noise magnetic field are in different directions, some error occurs in the detected angle value. The error occurring in the detected angle value will hereinafter be referred to as angular error.

U.S. Pat. Nos. 8,604,780 B2 and 8,659,289 B2 describe rotating field sensors that are capable of reducing an angular error caused by a noise magnetic field. Each of the rotating field sensors described in U.S. Pat. Nos. 8,604,780 B2 and 8,659,289 B2 is provided with a magnetic field generation unit for generating a rotating magnetic field, and a first and a second detection unit. The rotating magnetic field includes a first partial magnetic field present at a first position and a second partial magnetic field present at a second position. The first partial magnetic field and the second partial magnetic field are in directions different from each other by 180°, and rotate in the same rotational direction. The first detection unit is configured to detect, at the first position, a composite magnetic field of the first partial magnetic field and the noise magnetic field. The second detection unit is configured to detect, at the second position, a composite magnetic field of the second partial magnetic field and the noise magnetic field. The rotating field sensors described in U.S. Pat. Nos. 8,604,780 B2 and 8,659,289 B2 perform operations using the outputs from the first and second detection units to thereby generate a detected angle value in which the angular error caused by the noise magnetic field is reduced.

The rotating field sensors described in U.S. Pat. Nos. 8,604,780 B2 and 8,659,289 B2 each require the particular magnetic field generation unit for generating a rotating magnetic field that includes the first and second partial magnetic fields defined as above. Furthermore, locations of the first and second detection units are limited depending on the pattern of the rotating magnetic field. These rotating field sensors thus have substantial limitations with respect to structure and installation.

SUMMARY OF THE INVENTION

It is an object of the present invention to provide an angle sensor and an angle sensor system that enable reduction of an angular error caused by a noise magnetic field, without introducing substantial limitations with respect to structure and installation.

An angle sensor of the present invention is configured to generate a detected angle value having a correspondence with an angle to be detected. The angle sensor of the present invention includes a plurality of composite magnetic field information generation units, and an angle computing unit. The plurality of composite magnetic field information generation units are configured to detect, at a plurality of detection positions different from each other, a composite magnetic field of a magnetic field to be detected and a noise magnetic field other than the magnetic field to be detected, and to thereby generate a plurality of pieces of composite magnetic field information including information on at least the direction, out of the direction and the strength, of the composite magnetic field. The angle computing unit is configured to generate the detected angle value.

At each of the plurality of detection positions, the magnetic field to be detected varies in direction according to the angle to be detected. The magnetic field to be detected has different strengths at the plurality of detection positions. The angle computing unit generates the detected angle value by performing an operation using the plurality of pieces of composite magnetic field information so that an error of the detected angle value caused by the noise magnetic field is made smaller than in the case where the detected angle value is generated on the basis of any and only one of the plurality of pieces of composite magnetic field information.

In the angle sensor of the present invention, each of the plurality of composite magnetic field information generation units may include two detection signal generation units for generating two detection signals indicative of the strengths of two components of the composite magnetic field that are in mutually different directions. Each of the plurality of pieces of composite magnetic field information may be generated on the basis of the two detection signals. The two components of the composite magnetic field may be in mutually orthogonal directions. Each of the two detection signal generation units may include at least one magnetic detection element.

In the angle sensor of the present invention, the plurality of detection positions may be a first detection position and a second detection position. In such a case, the plurality of pieces of composite magnetic field information may be first composite magnetic field information including information on at least the direction, out of the direction and the strength, of the composite magnetic field at the first detection position, and second composite magnetic field information including information on at least the direction, out of the direction and the strength, of the composite magnetic field at the second detection position. The plurality of composite magnetic field information generation units may be a first composite magnetic field information generation unit for generating the first composite magnetic field information, and a second composite magnetic field information generation unit for generating the second composite magnetic field information.

The first composite magnetic field information may be an angle $\theta_1$ that the direction of the composite magnetic field at the first detection position forms with respect to a reference direction. The second composite magnetic field information may be an angle $\theta_2$ that the direction of the composite magnetic field at the second detection position forms with respect to the reference direction. In such a case, the angle computing unit may perform, as the operation using the plurality of pieces of composite magnetic field information, an operation using the angles $\theta_1$ and $\theta_2$ and the ratio of the strength of the magnetic field to be detected at the first detection position to the strength of the magnetic field to be detected at the second detection position.

Alternatively, the first composite magnetic field information may be represented as a first vector having a first direction and a first magnitude, and the second composite magnetic field information may be represented as a second vector having a second direction and a second magnitude. The first direction corresponds to the information on the direction of the composite magnetic field at the first detection position. The first magnitude corresponds to the information on the strength of the composite magnetic field at the first detection position. The second direction corresponds to the information on the direction of the composite magnetic field at the second detection position. The second magnitude corresponds to the information on the strength of the composite magnetic field at the second detection position. In such a case, the angle computing unit may perform, as the operation using the plurality of pieces of composite magnetic field information, an operation to determine a difference between the first vector and the second vector.

When the first composite magnetic field information is represented as the first vector and the second composite magnetic field information is represented as the second vector, the first composite magnetic field information generation unit may include a first detection signal generation unit for generating a first detection signal, a second detection signal generation unit for generating a second detection signal, and a first vector generation unit for generating the first vector. The first detection signal and the second detection signal are indicative of the strengths of two components of the composite magnetic field at the first detection position, the two components being in mutually orthogonal directions. The second composite magnetic field information generation unit may include a third detection signal generation unit for generating a third detection signal, a fourth detection signal generation unit for generating a fourth detection signal, and a second vector generation unit for generating the second vector. The third detection signal and the fourth detection signal are indicative of the strengths of two components of the composite magnetic field at the second detection position, the two components being in mutually orthogonal directions. In such a case, the first vector generation unit may determine the first direction and the first magnitude on the basis of the first detection signal and the second detection signal. The second vector generation unit may determine the second direction and the second magnitude on the basis of the third detection signal and the fourth detection signal.

When the first composite magnetic field information is represented as the first vector and the second composite magnetic field information is represented as the second vector, the first composite magnetic field information generation unit may include a first detection signal generation unit for generating a first detection signal, and a second detection signal generation unit for generating a second detection signal, the first detection signal and the second detection signal being indicative of the strengths of two components of the composite magnetic field at the first detection position, the two components being in mutually orthogonal directions. The second composite magnetic field information generation unit may include a third detection signal generation unit for generating a third detection signal, and a fourth detection signal generation unit for generating a fourth detection signal, the third detection signal and the fourth detection signal being indicative of the strengths of two components of the composite magnetic field at the second detection position, the two components being in mutually orthogonal directions. In such a case, the first detection signal and the second detection signal may be two components of the first vector in an orthogonal coordinate system. The third detection signal and the fourth detection signal may be two components of the second vector in the orthogonal coordinate system.

An angle sensor system of the present invention includes the angle sensor of the present invention and a magnetic field generation unit for generating a magnetic field to be detected. The plurality of detection positions are at mutually different distances from the magnetic field generation unit.

In the angle sensor system of the present invention, the plurality of detection positions may be mutually different positions on an imaginary straight line passing through the magnetic field generation unit.

According to the angle sensor and the angle sensor system of the present invention, performing an operation using the plurality of pieces of composite magnetic field information enables generation of a detected angle value in which the angular error caused by a noise magnetic field is made smaller than in the case of generating the detected angle value on the basis of any and only one of the plurality of pieces of composite magnetic field information. The present invention has to satisfy the condition that a magnetic field to be detected has different strengths at a plurality of detection positions; however, this condition introduces no substantial limitations with respect to the structure and installation of the angle sensor and the angle sensor system. The present invention thus enables reduction of an angular error caused by a noise magnetic field, without introducing substantial limitations with respect to the structure and installation of the angle sensor and the angle sensor system.

Other and further objects, features and advantages of the present invention will appear more fully from the following description.

BRIEF DESCRIPTION OF THE DRAWINGS

FIG. 6 is a perspective view of a portion of a magnetic detection element shown in

FIG. 4 and FIG. 5.

DETAILED DESCRIPTION OF THE PREFERRED EMBODIMENTS

First Embodiment

Figure 1:
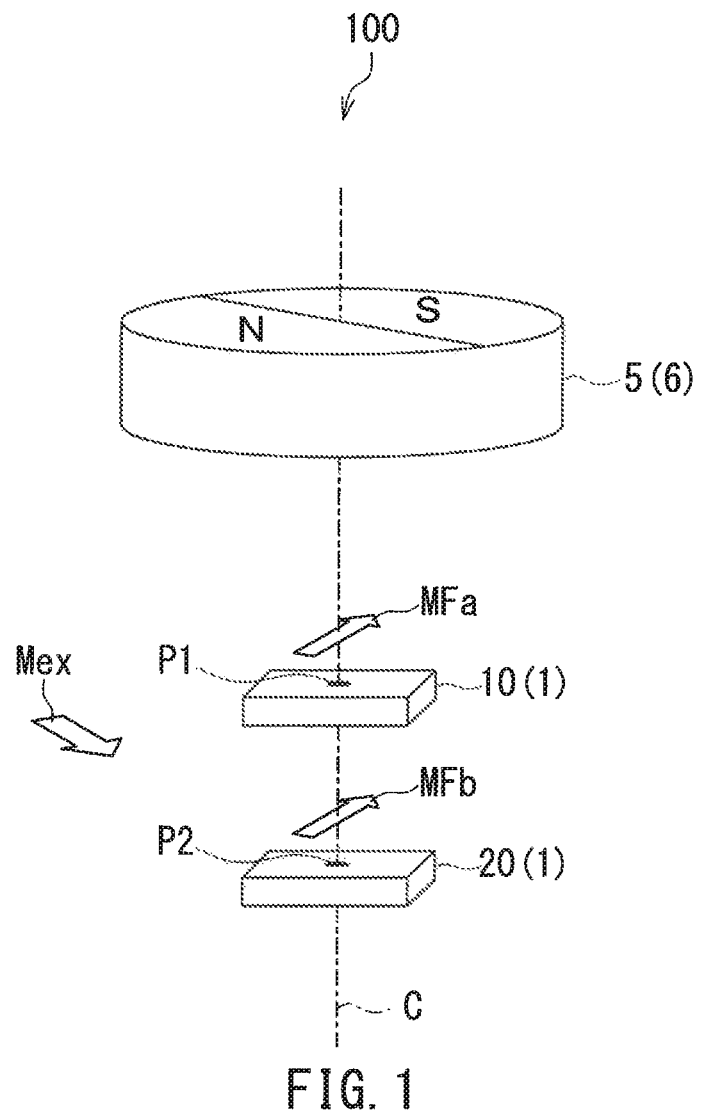
FIG. 1 is a perspective view illustrating the general configuration of an angle sensor system according to a first embodiment of the invention.

Preferred embodiments of the present invention will now be described in detail with reference to the drawings. First, reference is made to FIG. 1 to describe the general configuration of an angle sensor system according to a first embodiment of the invention. The angle sensor system 100 according to the first embodiment includes an angle sensor 1 according to the first embodiment and a magnetic field generation unit 5. The angle sensor 1 is a magnetic angle sensor, in particular. The magnetic field generation unit 5 generates a magnetic field to be detected by the angle sensor 1. Hereinafter, the magnetic field to be detected by the angle sensor 1 will be referred to as target magnetic field.

The magnetic field generation unit 5 of the present embodiment is a magnet 6 of a cylindrical shape. The magnet 6 has an N pole and an S pole that are arranged symmetrically with respect to an imaginary plane including the central axis of the cylindrical shape. The magnet 6 rotates about the central axis of the cylindrical shape. Consequently, the direction of the target magnetic field generated by the magnet 6 rotates about a center of rotation C including the central axis of the cylindrical shape.

The angle sensor 1 is configured to generate a detected angle value θs having a correspondence with an angle to be detected. In the present embodiment, the angle to be detected has a correspondence with an angle that the direction of the target magnetic field at a reference position forms with respect to a reference direction. Hereinafter, the angle that the direction of the target magnetic field at the reference position forms with respect to the reference direction will be referred to as rotating field angle, and denoted by the symbol θM.

The reference position is located within a reference plane. As used herein, the reference plane refers to an imaginary plane parallel to an end face of the magnet 6. In the reference plane, the direction of the target magnetic field generated by the magnet 6 rotates about the reference position. The reference direction is located within the reference plane and intersects the reference position. In the following description, the direction of the target magnetic field at the reference position refers to a direction located within the reference plane.

The angle sensor 1 includes a plurality of composite magnetic field information generation units. The plurality of composite magnetic field information generation units detect a composite magnetic field of the target magnetic field and a noise magnetic field other than the target magnetic field at a plurality of detection positions which are at mutually different distances from the the magnetic field generation unit 5, and thereby generate a plurality of pieces of composite magnetic field information including information on at least the direction, out of the direction and the strength, of the composite magnetic field. At each of the plurality of detection positions, the direction of the target magnetic field varies according to the angle to be detected and the rotating field angle θM. The target magnetic field has different strengths at the plurality of detection positions.

In the present embodiment, the plurality of detection positions are a first detection position P1 and a second detection position P2. The plurality of pieces of composite magnetic field information are first composite magnetic field information and second composite magnetic field information. The plurality of composite magnetic field information generation units are a first composite magnetic field information generation unit 10 and a second composite magnetic field information generation unit 20. The first and second composite magnetic field information generation units 10 and 20 are placed to face one end face of the magnet 6.

The first detection position P1 and the second detection position P2 are mutually different positions on an imaginary straight line passing through the magnetic field generation unit 5. The imaginary straight line may or may not coincide with the center of rotation C. FIG. 1 illustrates the former case. In the present embodiment, the second detection position P2 is at a greater distance from the magnetic field generation unit 5 than the first detection position P1.

The first composite magnetic field information generation unit 10 detects a composite magnetic field of the target magnetic field and a noise magnetic field at the first detection position P1 to thereby generate the first composite magnetic field information. The second composite magnetic field information generation unit 20 detects a composite magnetic field of the target magnetic field and the noise magnetic field at the second detection position P2 to thereby generate the second composite magnetic field information. Hereinafter, the target magnetic field at the first detection position P1 will be referred to as the first partial magnetic field MFa, and the target magnetic field at the second detection position P2 will be referred to as the second partial magnetic field MFb. The direction of the first partial magnetic field MFa and the direction of the second partial magnetic field MFb vary according to the angle to be detected and the rotating field angle θM. The first partial magnetic field MFa and the second partial magnetic field MFb are different in strength.

The first composite magnetic field information includes information on at least the direction, out of the direction and the strength, of the composite magnetic field at the first detection position P1. The second composite magnetic field information includes information on at least the direction, out of the direction and the strength, of the composite magnetic field at the second detection position P2. Hereinafter, the composite magnetic field at the first detection position P1 will be referred to as the first composite magnetic field MF1, and the composite magnetic field at the second detection position P2 will be referred to as the second composite magnetic field MF2.

The direction and the strength of the noise magnetic field at the second detection position P2 are respectively the same as the direction and the strength of the noise magnetic field at the first detection position P1. The noise magnetic field will be denoted by the symbol Mex. The noise magnetic field Mex may be a magnetic field whose direction and strength are temporally constant, a magnetic field whose direction and strength temporally vary in a periodic manner, or a magnetic field whose direction and strength temporally vary in a random fashion. The first composite magnetic field MF1 is a composite magnetic field of the first partial magnetic field MFa and the noise magnetic field Mex. The second composite magnetic field MF2 is a composite magnetic field of the second partial magnetic field MFb and the noise magnetic field Mex.

The angle sensor system 100 according to the present embodiment may have a different configuration than that shown in FIG. 1. For example, the magnetic field generation unit 5 and the first and second composite magnetic field information generation units 10 and 20 arranged as shown in FIG. 1 may be configured so that: the first and second composite magnetic field information generation units 10 and 20 rotate while the magnetic field generation unit 5 is fixed; the magnetic field generation unit 5 and the composite magnetic field information generation units 10, 20 rotate in mutually opposite directions; or the magnetic field generation unit 5 and the composite magnetic field information generation units 10, 20 rotate in the same direction with mutually different angular velocities.

Figure 2:
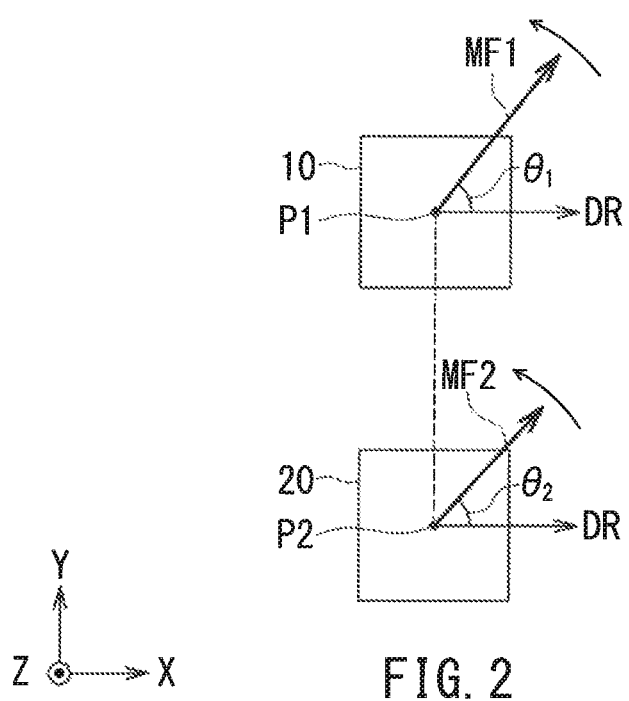
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the center of rotation C shown in FIG. 1 and upward in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The rotating field angle θM is expressed with respect to the reference direction DR. In the present embodiment, the X direction is the reference direction DR.

Assume that the directions of the first and second composite magnetic fields MF1 and MF2 both rotate counterclockwise in FIG. 2. As shown in FIG. 2, $\theta_1$ represents an angle that the direction of the first composite magnetic field MF1 forms with respect to the reference direction DR, and $\theta_2$ represents an angle that the direction of the second composite magnetic field MF2 forms with respect to the reference direction DR. The angles $\theta_1$ and $\theta_2$ are expressed in positive values when seen counterclockwise from the reference direction DR, and in negative values when seen clockwise from the reference direction DR.

The main component of the first composite magnetic field MF1 is the first partial magnetic field MFa. The main component of the second composite magnetic field MF2 is the second partial magnetic field MFb. The first and second partial magnetic fields MFa and Mfb are in the same direction. The direction of the first partial magnetic field MFa and the direction of the second partial magnetic field Mfb form the same angle with respect to the reference direction DR.

In the present embodiment, the direction of the first partial magnetic field MFa and the direction of the second partial magnetic field Mfb coincide with the direction of the target magnetic field at the reference position. The angle that the direction of each of the first and second partial magnetic fields MFa and Mfb forms with respect to the reference direction DR is equal to the rotating field angle θM. The definitions of positive and negative of these angles are the same as those of the angles $\theta_1$ and $\theta_2$.

As long as the above-described relationship between the first and second partial magnetic fields MFa and Mfb and the target magnetic field at the reference position is satisfied, the reference position may coincide with the first detection position P1 or the second detection position P2, or may be any position different therefrom.

As will be described in detail later, each composite magnetic field information is generated on the basis of the strengths of two components of the composite magnetic field that are in mutually different directions. In the present embodiment, the two components of the composite magnetic field are in mutually orthogonal directions, that is, the X direction and the Y direction.

Figure 3:
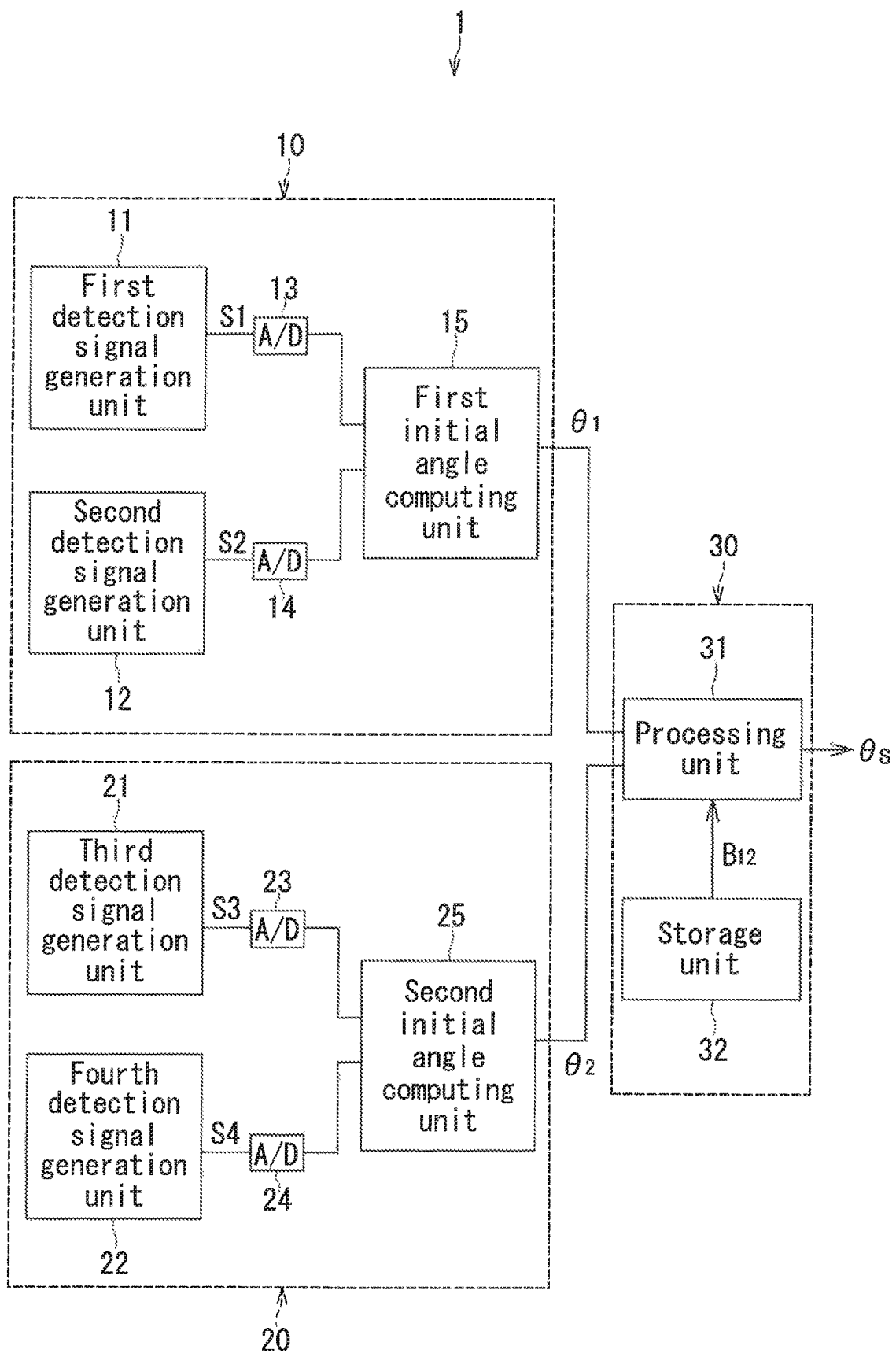
FIG. 3 is a block diagram illustrating the configuration of an angle sensor according to the first embodiment of the invention.

Reference is now made to FIG. 3 to describe the configuration of the angle sensor 1 in detail. FIG. 3 is a functional block diagram illustrating the configuration of the angle sensor 1. As previously mentioned, the angle sensor 1 includes a plurality of composite magnetic field information generation units. Each of the plurality of composite magnetic field information generation units includes two detection signal generation units for generating two detection signals indicative of the strengths of the two components in mutually different directions of the composite magnetic field. Each composite magnetic field information is generated on the basis of the two detection signals. Each of the two detection signal generation units includes at least one magnetic detection element. The at least one magnetic detection element may include at least one magnetoresistance element. The magnetoresistance element may be a giant magnetoresistance (GMR) element, a tunneling magnetoresistance (TMR) element, or an anisotropic magnetoresistance (AMR) element. The at least one magnetic detection element may further include at least one element other than the magnetoresistance element, such as a Hall element, for detecting a magnetic field.

In the present embodiment, the plurality of composite magnetic field information generation units are the first composite magnetic field information generation unit 10 and the second composite magnetic field information generation unit 20. The first composite magnetic field information generation unit 10 includes a first detection signal generation unit 11 and a second detection signal generation unit 12. The first detection signal generation unit 11 generates a first detection signal S1 indicative of the strength of a component in the X direction (hereinafter, "X-directional component") of the first composite magnetic field MF1. The second detection signal generation unit 12 generates a second detection signal S2 indicative of the strength of a component in the Y direction (hereinafter, "Y-directional component") of the first composite magnetic field MF1.

The first composite magnetic field information is generated on the basis of the first and second detection signals S1 and S2. In the present embodiment, the first composite magnetic field information is the angle $\theta_1$ that the direction of the first composite magnetic field MF1 forms with respect to the reference direction DR. The first composite magnetic field information generation unit 10 further includes analog-to-digital converters (hereinafter, "A/D converters") 13 and 14, and a first initial angle computing unit 15. The A/D converters 13 and 14 respectively convert the first and second detection signals S1 and S2 into digital signals. The first initial angle computing unit 15 determines the angle $\theta_1$ by performing an operation using the first and second detection signals S1 and S2, which have been converted into digital signals by the A/D converters 13 and 14, respectively. The first initial angle computing unit 15 can be implemented by an application-specific integrated circuit (ASIC), for example.

The second composite magnetic field information generation unit 20 includes a third detection signal generation unit 21 and a fourth detection signal generation unit 22. The third detection signal generation unit 21 generates a third detection signal S3 indicative of the strength of an X-directional component of the second composite magnetic field MF2. The fourth detection signal generation unit 22 generates a fourth detection signal S4 indicative of the strength of a Y-directional component of the second composite magnetic field MF2.

The second composite magnetic field information is generated on the basis of the third and fourth detection signals S3 and S4. In the present embodiment, the second composite magnetic field information is the angle $\theta_2$ that the direction of the second composite magnetic field MF2 forms with respect to the reference direction DR. The second composite magnetic field information generation unit 20 further includes A/D converters 23 and 24, and a second initial angle computing unit 25. The A/D converters 23 and 24 respectively convert the third and fourth detection signals S3 and S4 into digital signals. The second initial angle computing unit 25 determines the angle $\theta_2$ by performing an operation using the third and fourth detection signals S3 and S4, which have been converted into digital signals by the A/D converters 23 and 24, respectively. The second initial angle computing unit 25 can be implemented by an ASIC, for example.

As the direction of the target magnetic field rotates with a predetermined period, the rotating field angle θM varies with the predetermined period. In this case, all the first to fourth detection signals S1 to S4 vary periodically with a signal period equal to the aforementioned predetermined period. The phase of the second detection signal S2 is different from the phase of the first detection signal S1 by an odd number of times 1/4 the signal period. The third and fourth detection signals S3 and S4 are in phase with the first and second detection signals S1 and S2, respectively. In the light of the production accuracy of the magnetic detection elements or other factors, the relationships among the phases of the detection signals may be slightly different from the above-described relationships.

The angle sensor 1 further includes an angle computing unit 30 for generating the detected angle value Os. As previously mentioned, in the present embodiment, the target magnetic field has different strengths at the plurality of detection positions P1 and P2. This causes the noise magnetic field Mex to have different relative effects on the plurality of pieces of composite magnetic field information. This may result in a difference dependent on the noise magnetic field Mex between the plurality of pieces of composite magnetic field information. Using this characteristic, the angle computing unit 30 generates the detected angle value Os by performing an operation using the plurality of pieces of composite magnetic field information so that an error of the detected angle value Os caused by the noise magnetic field Mex is made smaller than in the case where the detected angle value Os is generated on the basis of any and only one of the plurality of pieces of composite magnetic field information. The angle computing unit 30 can be implemented by an ASIC or a microcomputer, for example. A method for generating the detected angle value Os will be described later.

Figure 4:
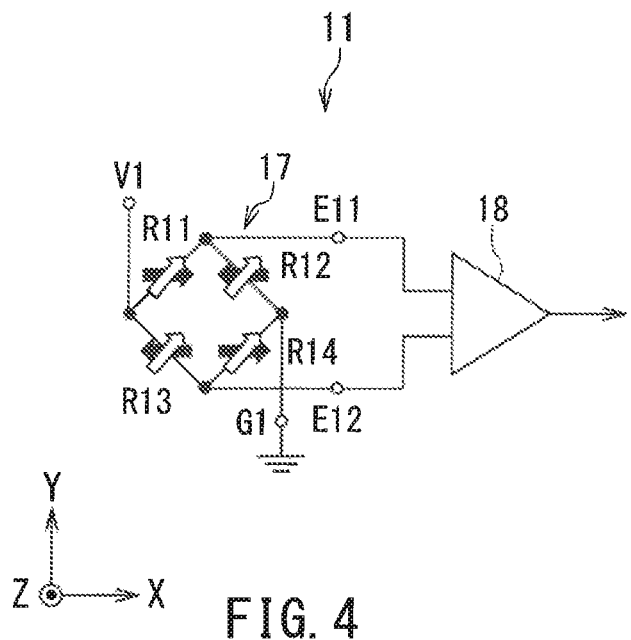
FIG. 4 is a circuit diagram illustrating an example configuration of a first detection signal generation unit of the first embodiment of the invention.

The configuration of the first to fourth detection signal generation units 11, 12, 21 and 22 will now be described. FIG. 4 illustrates an example of the specific configuration of the first detection signal generation unit 11. In this example, the first detection signal generation unit 11 includes a Wheatstone bridge circuit 17 and a difference detector 18. The Wheatstone bridge circuit 17 includes a power supply port V1, a ground port G1, two output ports E11 and E12, a first pair of serially connected magnetic detection elements R11 and R12, and a second pair of serially connected magnetic detection elements R13 and R14. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded.

Figure 5:
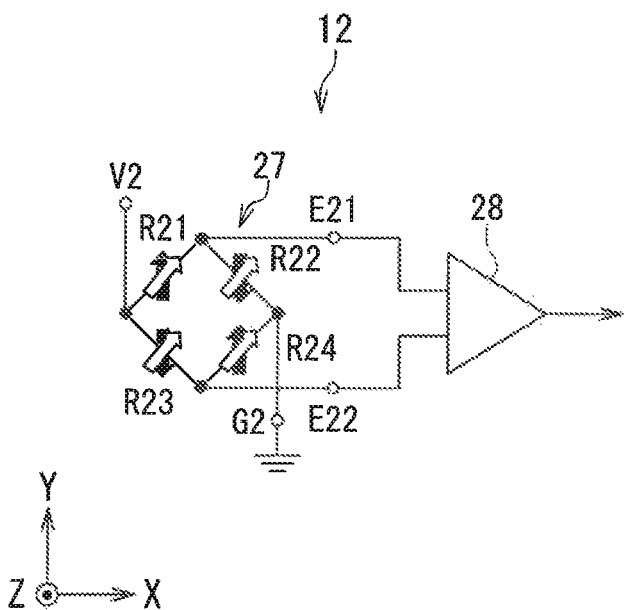
FIG. 5 is a circuit diagram illustrating an example configuration of a second detection signal generation unit of the first embodiment of the invention.

FIG. 5 illustrates an example of the specific configuration of the second detection signal generation unit 12. In this example, the second detection signal generation unit 12 includes a Wheatstone bridge circuit 27 and a difference detector 28. The Wheatstone bridge circuit 27 includes a power supply port V2, a ground port G2, two output ports E21 and E22, a first pair of serially connected magnetic detection elements R21 and R22, and a second pair of serially connected magnetic detection elements R23 and R24. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded.

The third and fourth detection signal generation units 21 and 22 have the same configuration as the first and second detection signal generation units 11 and 12, respectively. Thus, in the following description, components of the third and fourth detection signal generation units 21 and 22 are denoted by the same reference numerals as the components of the first and second detection signal generation units 11 and 12, respectively.

In the present embodiment, each of the magnetic detection elements R11 to R14 and R21 to R24 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction of the target magnetic field, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In FIG. 4 and FIG. 5, the filled arrows indicate the magnetization directions of the magnetization pinned layers of the MR elements, and the hollow arrows indicate the magnetization directions of the free layers of the MR elements.

In the first detection signal generation unit 11, the magnetization pinned layers of the MR elements included in the magnetic detection elements R11 and R14 are magnetized in the X direction, and the magnetization pinned layers of the MR elements included in the magnetic detection elements R12 and R13 are magnetized in the −X direction. In this case, the potential difference between the output ports E11 and E12 varies depending on the strength of the X-directional component of the first composite magnetic field MF1. The difference detector 18 outputs a signal corresponding to the potential difference between the output ports E11 and E12 as the first detection signal S1. Thus, the first detection signal generation unit 11 detects the strength of the X-directional component of the first composite magnetic field MF1 and generates the first detection signal S1 indicative of the strength.

In the second detection signal generation unit 12, the magnetization pinned layers of the MR elements included in the magnetic detection elements R21 and R24 are magnetized in the Y direction, and the magnetization pinned layers of the MR elements included in the magnetic detection elements R22 and R23 are magnetized in the −Y direction. In this case, the potential difference between the output ports E21 and E22 varies depending on the strength of the Y-directional component of the first composite magnetic field MF1. The difference detector 28 outputs a signal corresponding to the potential difference between the output ports E21 and E22 as the second detection signal S2. Thus, the second detection signal generation unit 12 detects the strength of the Y-directional component of the first composite magnetic field MF1 and generates the second detection signal S2 indicative of the strength.

In the third detection signal generation unit 21, the potential difference between the output ports E11 and E12 varies depending on the strength of the X-directional component of the second composite magnetic field MF2. The difference detector 18 outputs a signal corresponding to the potential difference between the output ports E11 and E12 as the third detection signal S3. Thus, the third detection signal generation unit 21 detects the strength of the X-directional component of the second composite magnetic field MF2 and generates the third detection signal S3 indicative of the strength.

In the fourth detection signal generation unit 22, the potential difference between the output ports E21 and E22 varies depending on the strength of the Y-directional component of the second composite magnetic field MF2. The difference detector 28 outputs a signal corresponding to the potential difference between the output ports E21 and E22 as the fourth detection signal S4. Thus, the fourth detection signal generation unit 22 detects the strength of the Y-directional component of the second composite magnetic field MF2 and generates the fourth detection signal S4 indicative of the strength.

In the light of the production accuracy of the MR elements and other factors, the magnetization directions of the magnetization pinned layers of the plurality of MR elements in the detection signal generation units 11, 12, 21 and 22 may be slightly different from the above-described directions.

Figure 6:
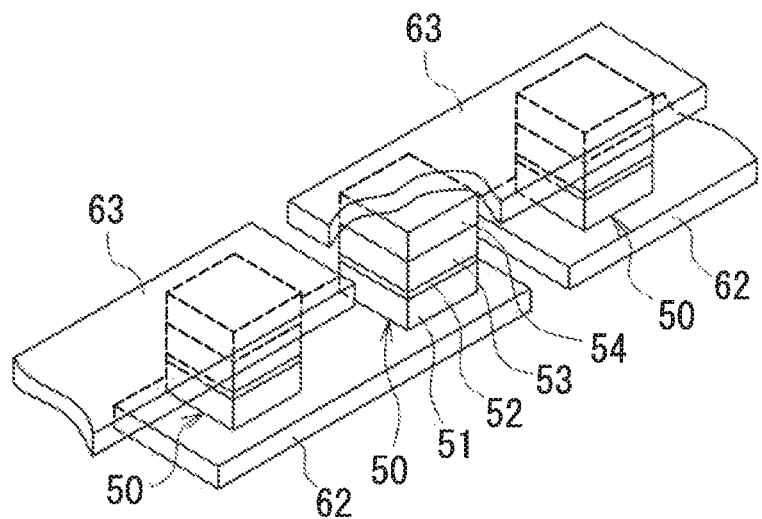

An example of the configuration of the magnetic detection elements will now be described with reference to FIG. 6. FIG. 6 is a perspective view illustrating a portion of a magnetic detection element in the detection signal generation units 11 and 12 shown in FIG. 4 and FIG. 5. In this example, the magnetic detection element includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 6, MR elements 50 are provided on the top surfaces of the lower electrodes 62, near opposite ends in the longitudinal direction. Each of the MR elements 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the plurality of MR elements 50 in the magnetic detection element shown in FIG. 6 are connected in series by the plurality of lower electrodes 62 and the plurality of upper electrodes 63. It should be appreciated that the layers 51 to 54 of the MR elements 50 may be stacked in the reverse order to that shown in FIG. 6. Now, a description will be given of a method for generating the first composite magnetic field information and the second composite magnetic field information. The first initial angle computing unit 15 of the first composite magnetic field information generation unit 10 calculates the angle $\theta_1$ as the first composite magnetic field information. The angle $\theta_1$ is determined by calculating the arctangent of the ratio of the second detection signal S2 to the first detection signal S1 as shown in the following Eq. (1). Note that "atan" represents arctangent.

$$\theta_1 = \operatorname{atan}(S2/S1) \tag{1}$$

For $\theta_1$ within the range of 0° to less than 360°, Eq. (1) yields two solutions that are 180° different in value. Which of the two solutions for $\theta_1$ in Eq. (1) is the true value of $\theta_1$ can be determined from the combination of positive and negative signs of S1 and S2. The first initial angle computing unit 15 determines $\theta_1$ within the range of 0° to less than 360° using Eq. (1) and the foregoing determination on the combination of positive and negative signs of S1 and S2.

The second initial angle computing unit 25 of the second composite magnetic field information generation unit 20 calculates the angle $\theta_2$ as the second composite magnetic field information. The angle $\theta_2$ is determined by calculating the arctangent of the ratio of the fourth detection signal S4 to the third detection signal S3 as shown in the following Eq. (2).

$$\theta_2 = \operatorname{atan}(S4/S3) \tag{2}$$

For $\theta_2$ within the range of 0° to less than 360°, Eq. (2) yields two solutions that are 180° different in value. Which of the two solutions for $\theta_2$ in Eq. (2) is the true value of $\theta_2$ can be determined from the combination of positive and negative signs of S3 and S4. The second initial angle computing unit 25 determines $\theta_2$ within the range of 0° to less than 360° using Eq. (2) and the foregoing determination on the combination of positive and negative signs of S3 and S4.

A method for generating the detected angle value Os will now be described. First, a description will be given of the relationship between the angles $\theta_1$, $\theta_2$ and the rotating field angle $\theta M$. When the noise magnetic field Mex is absent, the angle $\theta_1$ is equal to the rotating field angle $\theta M$. However, when the noise magnetic field Mex is present, the direction of the first composite magnetic field MF1 may deviate from the direction of the first partial magnetic field MFa to cause the angle $\theta_1$ to differ from the rotating field angle $\theta M$ in value. The difference between the angle $\theta_1$ and the rotating field angle $\theta M$ will hereinafter be referred to as the angular error of the angle $\theta_1$. The angular error of the angle $\theta_1$ is caused by the noise magnetic field Mex.

Likewise, when the noise magnetic field Mex is absent, the angle $\theta_2$ is equal to the rotating field angle $\theta M$. When the noise magnetic field Mex is present, the direction of the second composite magnetic field MF2 may deviate from the direction of the second partial magnetic field MFb to cause the angle $\theta_2$ to differ from the rotating field angle $\theta M$ in value. The difference between the angle $\theta_2$ and the rotating field angle $\theta M$ will hereinafter be referred to as the angular error of the angle $\theta_2$. The angular error of the angle $\theta_2$ is caused by the noise magnetic field Mex.

Figure 7A:
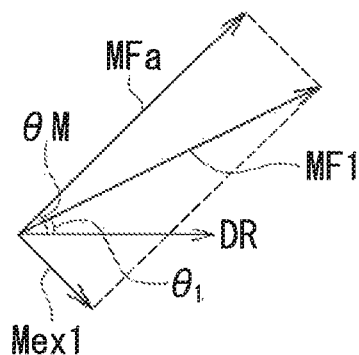
FIG. 7A is an explanatory diagram schematically illustrating the relationship between a first composite magnetic field and a noise magnetic field in the first embodiment of the invention.
Figure 7B:
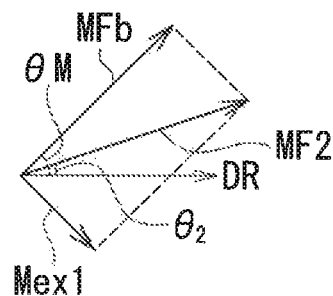
FIG. 7B is an explanatory diagram schematically illustrating the relationship between a second composite magnetic field and the noise magnetic field in the first embodiment of the invention.

Assume here two components of the noise magnetic field Mex: a first component orthogonal to the first and second partial magnetic fields MFa and MFb; and a second component parallel to the first and second partial magnetic fields MFa and MFb. FIG. 7A and FIG. 7B are explanatory diagrams schematically illustrating the relationship between the first and second composite magnetic fields MF1, MF2 and the noise magnetic field Mex. FIG. 7A illustrates the relationship between the first composite magnetic field MF1 and the first component of the noise magnetic field Mex. FIG. 7B illustrates the relationship between the second composite magnetic field MF2 and the first component of the noise magnetic field Mex. In each of FIG. 7A and FIG. 7B, the arrow labeled Mex1 represents the first component of the noise magnetic field Mex. In FIG. 7A and FIG. 7B the magnitude of the first component Mex1 is exaggerated. As shown in FIG. 7A and FIG. 7B, the directions of the first and second composite magnetic fields MF1 and MF2 deviate from the directions of the first and second partial magnetic fields MFa and MFb, respectively, due to the effect of the first component Mex1.

Assume that in the present embodiment, the strength of the noise magnetic field Mex is sufficiently smaller than the strengths of the first and second partial magnetic fields MFa and MFb to the extent that the second component of the noise magnetic field Mex has a negligible effect on the directional deviations of the first and second composite magnetic fields MF1 and MF2. In FIG. 7A and FIG. 7B, the first composite magnetic field MF1 is represented as a composite magnetic field of the first partial magnetic field MFa and the first component Mex1 of the noise magnetic field Mex, and the second composite magnetic field MF2 is represented as a composite magnetic field of the second partial magnetic field MFb and the first component Mex1 of the noise magnetic field Mex.

As shown in FIG. 7A, a deviation of the direction of the first composite magnetic field MF1 from the direction of the first partial magnetic field MFa causes an angular error of the angle $\theta_1$. The angular error of the angle $\theta_1$ is $\operatorname{atan}(B_{ex}/B_1)$, where $B_1$ represents the strength of the first partial magnetic field MFa, and $B_{ex}$ represents the strength of the first component Mex1 of the noise magnetic field Mex.

As shown in FIG. 7B, a deviation of the direction of the second composite magnetic field MF2 from the direction of the second partial magnetic field MFb causes an angular error of the angle $\theta_2$. The angular error of the angle $\theta_2$ is $\operatorname{atan}(B_{ex}/B_2)$, where $B_2$ represents the strength of the second partial magnetic field MFb.

The angle $\theta_1$ is expressible by using the rotating field angle $\theta M$ and the angular error of the angle $\theta_1$. The angle $\theta_2$ is expressible by using the rotating field angle $\theta M$ and the angular error of the angle $\theta_2$. Specifically, the angles $\theta_1$ and $\theta_2$ are expressible by the following Eqs. (3) and (4), respectively.

$$\theta_1 = \theta M - \operatorname{atan}(B_{ex}/B_1) \tag{3}$$

$$\theta_2 = \theta M - \operatorname{atan}(B_{ex}/B_2) \tag{4}$$

When x is sufficiently small, atan(x) can be approximated as AT·x. AT is a constant value, an example of which is 56.57. In the present embodiment, since the strength $B_{ex}$ of the first component Mex1 of the noise magnetic field Mex is sufficiently smaller than the strengths $B_1$ and $B_2$ of the first and second partial magnetic fields MFa and MFb, $\operatorname{atan}(B_{ex}/B_1)$ can be approximated as AT·$(B_{ex}/B_1)$, and $\operatorname{atan}(B_{ex}/B_2)$ can be approximated as AT·$(B_{ex}/B_2)$. Applying the approximation to Eq. (3) and rearranging the equation allows $B_1$ to be expressed by the following Eq. (5).

$$B_{ex} = -B_1 \cdot (\theta_1 - \theta M)/AT \tag{5}$$

Applying the above-described approximation to Eq. (4) to rearrange the equation and further substituting Eq. (5) into the rearranged equation yields the following Eq. (6).

$$\theta_2 = \theta M + B_1 \cdot (\theta_1 - \theta M)/B_2 \quad (6)$$

Rearranging Eq. (6) allows the rotating field angle θM to be expressed by the following Eq. (7).

$$\theta M = \{\theta_2 - (B_1/B_2)\cdot\theta_1\}/\{1-(B_1/B_2)\} \quad (7)$$

In Eq. (7), "$B_1/B_2$" represents the ratio of the strength $B_1$ of the first partial magnetic field MFa to the strength $B_2$ of the second partial magnetic field MFb. This ratio will be denoted by the symbol $B_{12}$. In the present embodiment, the value of the ratio $B_{12}$ depends on the positional relationship between the first and second detection positions P1 and P2, and is constant regardless of the value of the rotating field angle θM.

Next, the method by which the angle computing unit 30 generates the detected angle value θs will be specifically described. In the present embodiment, the angle computing unit 30 performs an operation using the angles $\theta_1$ and $\theta_2$ and the ratio $B_{12}$, as the operation using the plurality of pieces of composite magnetic field information. To be more specific, the angle computing unit 30 generates the detected angle value θs by performing an operation expressed by the following Eq. (8), which is similar to Eq. (7), as the operation using the plurality of pieces of composite magnetic field information.

$$\theta s = (\theta_2 - B_{12}\cdot\theta_1)/(1-B_{12}) \quad (8)$$

In Eq. (8), "θs" and "$B_{12}$" are substituted for "θM" and "$B_1/B_2$" of Eq. (7), respectively.

The angle computing unit 30 includes a processing unit 31 for calculating the detected angle value θs, and a storage unit 32 for storing the value of the ratio $B_{12}$ of the strength $B_1$ of the first partial magnetic field MFa to the strength $B_2$ of the second partial magnetic field MFb. The processing unit 31 calculates the detected angle value θs by Eq. (8) using the angle $\theta_1$ calculated by the first initial angle computing unit 15 of the first composite magnetic field information generation unit 10, the angle $\theta_2$ calculated by the second initial angle computing unit 25 of the second composite magnetic field information generation unit 20, and the ratio $B_{12}$ stored in the storage unit 32.

The value of the ratio $B_{12}$ is obtained by measurement of the strength $B_1$ of the first partial magnetic field MFa and the strength $B_2$ of the second partial magnetic field MFb. The measurement of the strength $B_1$ of the first partial magnetic field MFa and the strength $B_2$ of the second partial magnetic field MFb is performed by a control unit (not illustrated) outside the angle sensor 1 before or after the shipment of the angle sensor 1. The measurement of the strength $B_1$ of the first partial magnetic field MFa and the strength $B_2$ of the second partial magnetic field MFb may be performed using the first and second composite magnetic field information generation units 10 and 20, or other magnetic sensors.

According to the present embodiment, performing the operation using the first composite magnetic field information and the second composite magnetic field information enables generation of the detected angle value θs in which the angular error caused by the noise magnetic field Mex is made smaller than in the case of generating the detected angle value θs on the basis of either and only one of the first composite magnetic field information and the second composite magnetic field information. The reason therefor will be described in detail below.

As is apparent from Eq. (3), the angle $\theta_1$ varies depending on the angular error "atan($B_{ex}/B_1$)" caused by the noise magnetic field Mex. As is apparent from Eq. (4), the angle $\theta_2$ varies depending on the angular error "atan($B_{ex}/B_2$)" caused by the noise magnetic field Mex. In the present embodiment, the angle $\theta_1$ represents the first composite magnetic field information, and the angle $\theta_2$ represents the second composite magnetic field information. Therefore, Eqs. (3) and (4) indicate that the noise magnetic field Mex has an effect on each of the first composite magnetic field information and the second composite magnetic field information.

In the present embodiment, the strength $B_1$ of the first partial magnetic field MFa and the strength $B_2$ of the second partial magnetic field MFb are different from each other. Thus, the noise magnetic field Mex has different relative effects on the first composite magnetic field information and the second composite magnetic field information. This may result in a difference dependent on the noise magnetic field Mex between the first composite magnetic field information and the second composite magnetic field information. To be more specific, a difference dependent on the noise magnetic field Mex results between the values of the angular errors of the angles $\theta_1$ and $\theta_2$. The rotating field angle θM expressed by Eq. (7) is led using this characteristic. In the present embodiment, the detected angle value θs is generated by performing the operation using the first composite magnetic field information and the second composite magnetic field information, more specifically, the operation of Eq. (8).

Each of the angles $\theta_1$ and $\theta_2$ corresponds to the detected angle value θs that is generated on the basis of either and only one of the first composite magnetic field information and the second composite magnetic field information. As described previously, the angles $\theta_1$ and $\theta_2$ contain the angular errors caused by the noise magnetic field Mex. On the other hand, since the rotating field angle θM contains no angular error caused by the noise magnetic field Mex, the detected angle value θs generated by performing the operation of Eq. (8) theoretically contains no angular error caused by the noise magnetic field Mex. The present embodiment thus enables generation of the detected angle value θs in which the angular error caused by the noise magnetic field Mex is made smaller than in the angles $\theta_1$ and $\theta_2$.

To generate the detected angle value θs as described above in the present embodiment, it is required to satisfy the condition that the strength $B_1$ of the first partial magnetic field MFa and the strength $B_2$ of the second partial magnetic field Mfb are different from each other; however, this condition introduces no substantial limitations with respect to the structure and installation of the angle sensor 1 and the angle sensor system 100. The aforementioned condition can easily be satisfied by, for example, making the first detection position P1 and the second detection position P2 differ from each other as in the present embodiment. The present embodiment thus enables reduction of the angular error caused by the noise magnetic field Mex, without introducing substantial limitations with respect to the structure and installation of the angle sensor 1 and the angle sensor system 100.

The effects of the present embodiment will now be described with reference to simulation results. The simulation determined the respective angular errors of the angle $\theta_1$, the angle $\theta_2$ and the detected angle value θs that were generated in the presence of a noise magnetic field Mex having a constant direction and strength. In the simulation, the difference between the angle $\theta_1$ and the rotating field angle θM was assumed to be the angular error of the angle $\theta_1$, the difference between the angle $\theta_2$ and the rotating field angle $\theta M$ was assumed to be the angular error of the angle $\theta_2$, and the difference between the detected angle value $\theta s$ and the rotating field angle $\theta M$ was assumed to be the angular error of the detected angle value $\theta s$. Further, in the simulation, an error generated by a random number was superimposed on each of the values of the angles $\theta_1$ and $\theta_2$. The error is assumed to be a normal error generated in the angle sensor 1. The normal error includes an error owing to the nonlinearity of the first or second composite magnetic field information generation unit 10 or 20 and an error owing to white noise. An angular error caused by the normal error is sufficiently smaller than an angular error caused by the noise magnetic field Mex.

Figure 8:
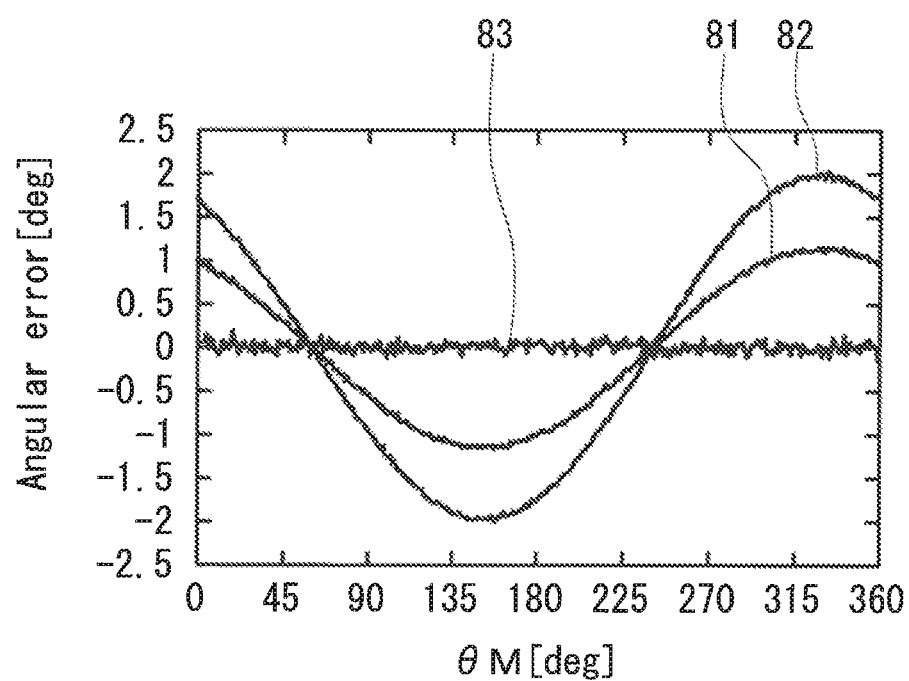
FIG. 8 is a waveform diagram illustrating an example of waveforms of angular errors of the first embodiment of the invention.

FIG. 8 is a waveform diagram illustrating an example of angular errors obtained by the simulation. In FIG. 8 the horizontal axis represents the rotating field angle $\theta M$, and the vertical axis represents the angular error. The reference numeral 81 represents the angular error of the angle $\theta_1$, the reference numeral 82 represents the angular error of the angle $\theta_2$, and the reference numeral 83 represents the angular error of the detected angle value $\theta s$. As shown in FIG. 8, the angular error of the detected angle value $\theta s$ is extremely smaller than the angular error of the angle $\theta_1$ and the angular error of the angle $\theta_2$. The angular errors of the the angles $\theta_1$ and $\theta_2$ are mainly attributable to the noise magnetic field Mex. On the other hand, the angular error of the detected angle value $\theta s$ is mainly attributable to the normal error. Thus, the present embodiment enables reduction of angular errors caused by the noise magnetic field Mex.

As shown in FIG. 8, the angular error of the angle $\theta_1$ and the angular error of the angle $\theta_2$ are different from each other. This is due to the difference between the relative effects of the noise magnetic field Mex on the first composite magnetic field information and the second composite magnetic field information. In the present embodiment, the second detection position P2 is located farther from the magnetic field generation unit 5 than is the first detection position P1. Thus, the strength $B_2$ of the second partial magnetic field Mfb is smaller than the strength $B_1$ of the first partial magnetic field MFa. As a result, the angular error of the angle $\theta_2$ is greater than the angular error of the angle $\theta_1$.

Second Embodiment

Figure 9:
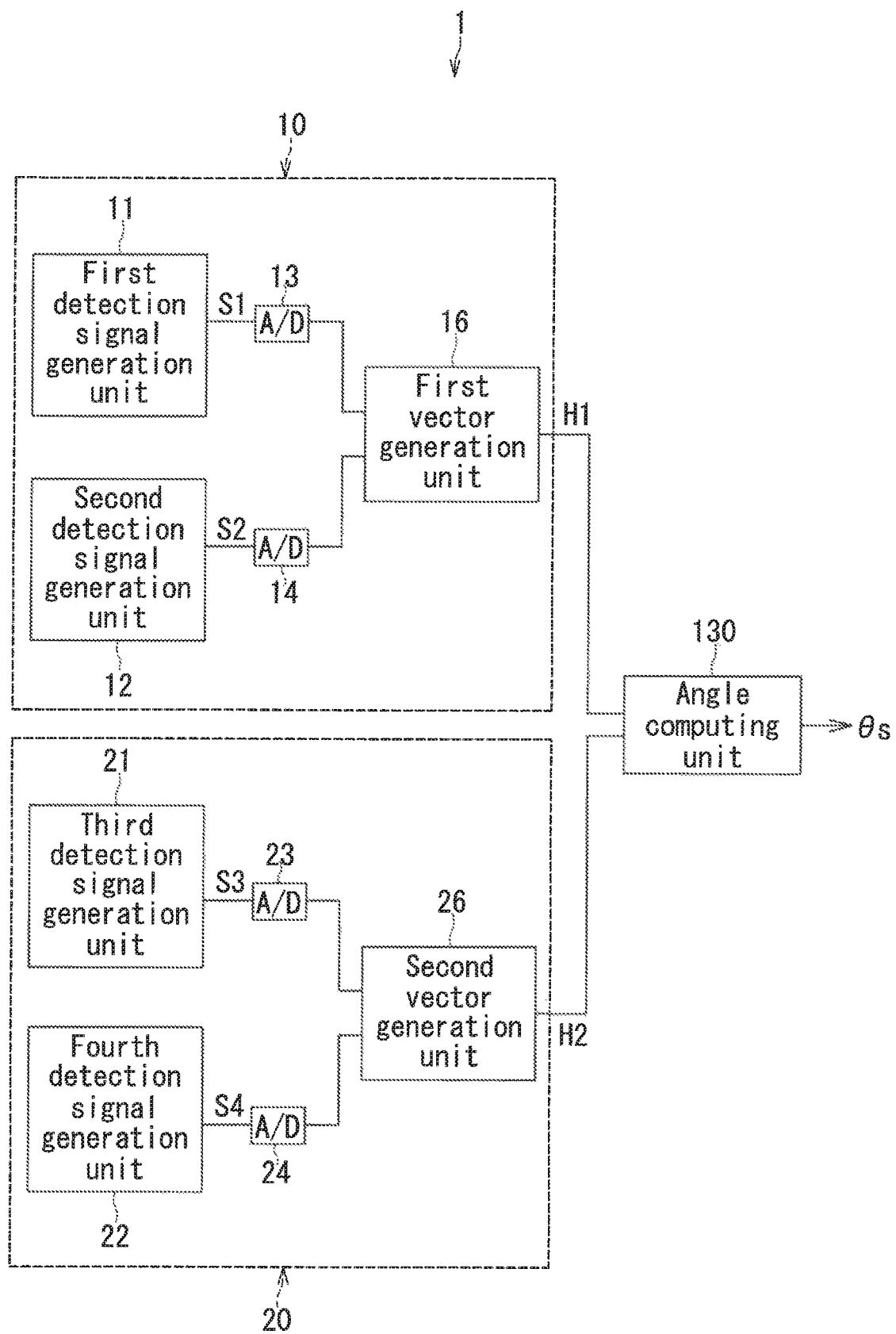
FIG. 9 is a block diagram illustrating the configuration of an angle sensor according to a second embodiment of the invention.

A second embodiment of the present invention will now be described. First, reference is made to FIG. 9 to describe the configuration of the angle sensor 1 according to the second embodiment. The angle sensor 1 according to the second embodiment differs from the angle sensor 1 according to the first embodiment in the following ways. In the present embodiment, the first composite magnetic field information is represented as a first vector H1 having a first direction $D_1$ and a first magnitude $A_1$. The second composite magnetic field information is represented as a second vector H2 having a second direction $D_2$ and a second magnitude $A_2$. As shown in FIG. 9, the first composite magnetic field information generation unit 10 includes a first vector generation unit 16 for generating the first vector H1, in place of the first initial angle computing unit 15 of the first embodiment. The second composite magnetic field information generation unit 20 includes a second vector generation unit 26 for generating the second vector H2, in place of the second initial angle computing unit 25 of the first embodiment. The first and second vector generation units 16 and 26 can each be implemented by an ASIC, for example.

The first direction $D_1$ corresponds to information on the direction of the first composite magnetic field MF1. In the present embodiment, the first direction $D_1$ is expressed using the angle $\theta_1$ (see FIG. 2) that the direction of the first composite magnetic field MF1 forms with respect to the reference direction DR. The first magnitude $A_1$ corresponds to information on the strength of the first composite magnetic field MF1.

The second direction $D_2$ corresponds to information on the direction of the second composite magnetic field MF2. In the present embodiment, the second direction $D_2$ is expressed using the angle $\theta_2$ (see FIG. 2) that the direction of the second composite magnetic field MF2 forms with respect to the reference direction DR. The second magnitude $A_2$ corresponds to information on the strength of the second composite magnetic field MF2.

The angle sensor 1 according to the present embodiment includes an angle computing unit 130 in place of the angle computing unit 30 of the first embodiment. The angle computing unit 130 performs an operation to obtain the difference between the first vector H1 and the second vector H2, as the operation using the plurality of pieces of composite magnetic field information. The angle computing unit 130 can be implemented by an ASIC or a microcomputer, for example.

A method for generating the first and second vectors H1 and H2 will now be described. The first vector generation unit 16 determines the first direction $D_1$ and the first magnitude $A_1$ of the first vector H1 on the basis of the first and second detection signals S1 and S2 converted into digital signals by the A/D converters 13 and 14, respectively. To be more specific, the first vector generation unit 16 calculates the arctangent of the the ratio of the second detection signal S2 to the first detection signal S1 to determine the first direction $D_1$, i.e., the angle $\theta_1$. The specific calculation method for the angle $\theta_1$ is the same as that in the first embodiment.

Further, the first vector generation unit 16 calculates the sum $S1^2+S2^2$ of the square of the first detection signal S1 and the square of the second detection signal S2 to determine the first magnitude $A_1$. As has been described in relation to the first embodiment, the first detection signal S1 is indicative of the strength of the X-directional component of the first composite magnetic field MF1, and the second detection signal S2 is indicative of the strength of the Y-directional component of the first composite magnetic field MF1. Thus, $S1^2+S2^2$ is a parameter having a correspondence with the strength of the first composite magnetic field MF1. The first magnitude $A_1$ may be $S1^2+S2^2$ itself, or may be the strength of the first composite magnetic field MF1 determined from $S1^2+S2^2$. Alternatively, the first vector generation unit 16 may determine the value of a parameter, other than $S1^2+S2^2$ described above, having a correspondence with the strength of the first composite magnetic field MF1 on the basis of the first and second detection signals S1 and S2, and determine the first magnitude $A_1$ on the basis of the parameter value.

The second vector generation unit 26 determines the second direction $D_2$ and the second magnitude $A_2$ of the second vector H2 on the basis of the third and fourth detection signals S3 and S4 converted into digital signals by the A/D converters 23 and 24, respectively. To be more specific, the second vector generation unit 26 calculates the arctangent of the the ratio of the fourth detection signal S4 to the third detection signal S3 to determine the second direction $D_2$, i.e., the angle $\theta_2$. The specific calculation method for the angle $\theta_2$ is the same as that in the first embodiment.

Further, the second vector generation unit 26 calculates the sum $S3^2+S4^2$ of the square of the third detection signal S3 and the square of the fourth detection signal S4 to determine the second magnitude $A_2$. As has been described in relation to the first embodiment, the third detection signal S3 is indicative of the strength of the X-directional component of the second composite magnetic field MF2, and the fourth detection signal S4 is indicative of the strength of the Y-directional component of the second composite magnetic field MF2. Thus, $S3^2+S4^2$ is a parameter having a correspondence with the strength of the second composite magnetic field MF2. The second magnitude $A_2$ may be $S3^2+S4^2$ itself, or may be the strength of the second composite magnetic field MF2 determined from $S3^2+S4^2$. Alternatively, the second vector generation unit 26 may determine the value of a parameter, other than $S3^2+S4^2$ described above, having a correspondence with the strength of the second composite magnetic field MF2 on the basis of the third and fourth detection signals S3 and S4, and determine the second magnitude $A_2$ on the basis of the parameter value.

When the rotating field angle $\theta M$ varies with a predetermined period, ideally, the first detection signal S1 has a cosine waveform dependent on the rotating field angle $\theta M$, and the second detection signal S2 has a sine waveform dependent on the rotating field angle $\theta M$. Thus, ideally, $S1^2+S2^2$ is a constant value independently of the rotating field angle $\theta M$. Likewise, when the rotating field angle $\theta M$ varies with a predetermined period, ideally, the third detection signal S3 has a cosine waveform dependent on the rotating field angle $\theta M$, and the fourth detection signal S4 has a sine waveform dependent on the rotating field angle $\theta M$. Thus, ideally, $S3^2+S4^2$ is a constant value independently of the rotating field angle $\theta M$.

To determine the first and second magnitudes $A_1$ and $A_2$ in the above-described manner, it is necessary to use the first to fourth detection signal generation units 11, 12, 21 and 22 under the condition that the magnitudes of the first to fourth detection signals S1 to S4 do not become saturated within the range of the strengths of the first and second composite magnetic fields MF1 and MF2.

Next, a description will be given of the configuration of the angle computing unit 130 and a method for generating the detected angle value $\theta s$. The angle computing unit 130 performs the operation to obtain the difference between the first vector H1 and the second vector H2. A third vector H3 is defined here as the following Eq. (9).

$$H3=H1-H2 \quad (9)$$

The third vector H3 has a third direction and a third magnitude. The angle computing unit 130 generates the detected angle value $\theta s$ by determining the third direction.

Figure 10:
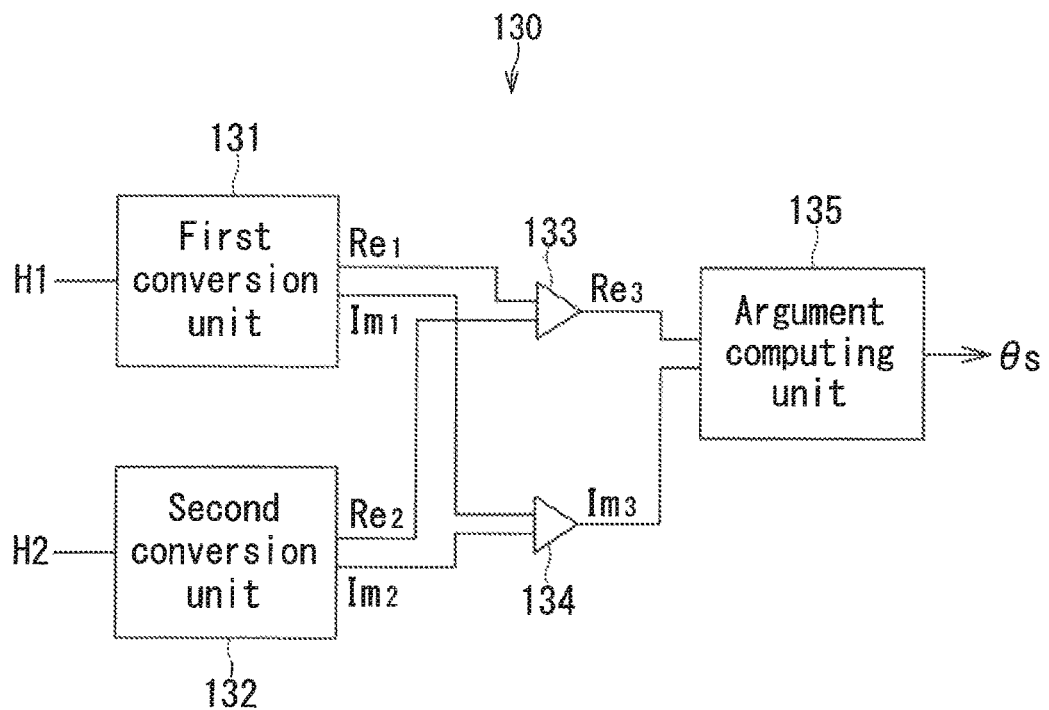
FIG. 10 is a block diagram illustrating an example configuration of an angle computing unit of the second embodiment of the invention.

In the present embodiment, the angle computing unit 130 performs operations using complex numbers. FIG. 10 is a block diagram illustrating an example configuration of the angle computing unit 130. In this example, the angle computing unit 130 includes a first conversion unit 131, a second conversion unit 132, a first computing unit 133, a second computing unit 134, and an argument computing unit 135. The first conversion unit 131 converts the first vector H1 into a complex number C1. The real part $Re_1$ and the imaginary part $Im_1$ of the complex number C1 are expressed by the following Eqs. (10) and (11), respectively.

$$Re_1=A_1 \cdot \cos\theta_1 \quad (10)$$

$$Im_1=A_1 \cdot \sin\theta_1 \quad (11)$$

The second conversion unit 132 converts the second vector H2 into a complex number C2. The real part $Re_2$ and the imaginary part $Im_2$ of the complex number C2 are expressed by the following Eqs. (12) and (13), respectively.

$$Re_2=A_2 \cdot \cos\theta_2 \quad (12)$$

$$Im_2=A_2 \cdot \sin\theta_2 \quad (13)$$

The operation to obtain the difference between the complex number C1 and the complex number C2 corresponds to the operation to obtain the difference between the first vector H1 and the second vector H2. A complex number C3 is defined here as as the following Eq. (14).

$$C3=C1-C2 \quad (14)$$

The first computing unit 133 determines the real part $Re_3$ of the complex number C3 by performing an operation to obtain the difference between the real part $Re_1$ of the complex number C1 and the real part $Re_2$ of the complex number C2. The second computing unit 134 determines the imaginary part $Im_3$ of the complex number C3 by performing an operation to obtain the difference between the imaginary part $Im_1$ of the complex number C1 and the imaginary part $Im_2$ of the complex number C2. The real part $Re_3$ and the imaginary part $Im_3$ are expressed by the following Eqs. (15) and (16), respectively.

$$Re_3=Re_1-Re_2 \quad (15)$$

$$Im_3=Im_1-Im_2 \quad (16)$$

The argument of the complex number C3 corresponds to the third direction of the third vector H3. In the present embodiment, the argument of the complex number C3 is assumed to be the detected angle value $\theta s$. The argument computing unit 135 obtains the argument of the complex number 3 to calculate the detected angle value $\theta s$. To be more specific, the argument computing unit 135 calculates $\theta s$ by, for example, using the real part $Re_3$ and the imaginary part $Im_3$ of the complex number C3 as follows.

$$\theta s=\operatorname{atan}(Im_3/Re_3) \quad (17)$$

For $\theta s$ within the range of 0° to less than 360°, Eq. (17) yields two solutions that are 180° different in value. Which of the two solutions for $\theta s$ in Eq. (17) is the true value of $\theta s$ can be determined from the combination of positive and negative signs of $Re_3$ and $Im_3$. The argument computing unit 135 determines $\theta s$ within the range of 0° to less than 360° using Eq. (17) and the foregoing determination on the combination of positive and negative signs of $Re_3$ and $Im_3$.

According to the present embodiment, performing the operation using the first composite magnetic field information and the second composite magnetic field information enables generation of the detected angle value $\theta s$ in which the angular error caused by the noise magnetic field Mex is made smaller than in the case of generating the detected angle value $\theta s$ on the basis of either and only one of the first composite magnetic field information and the second composite magnetic field information. The reason therefor will be described below with reference to FIG. 11A to FIG. 11C.

Figure 11A:
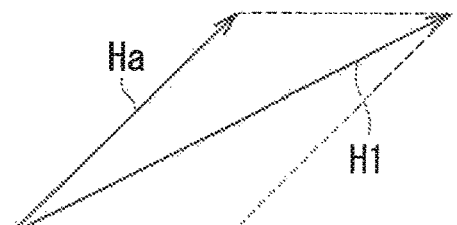
FIG. 11A is an explanatory diagram schematically illustrating a first vector of the second embodiment of the invention.
Figure 11B:
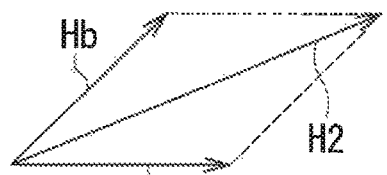
FIG. 11B is an explanatory diagram schematically illustrating a second vector of the second embodiment of the invention.
Figure 11C:
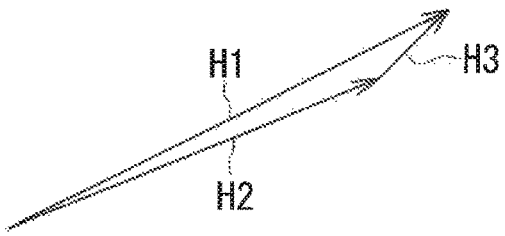
FIG. 11C is an explanatory diagram schematically illustrating a third vector of the second embodiment of the invention.

FIG. 11A to FIG. 11C are explanatory diagrams schematically illustrating the first to third vectors H1 to H3. FIG. 11A illustrates the first vector H1, FIG. 11B illustrates the second vector H2, and FIG. 11C illustrates the third vector H3.

FIG. 11A and FIG. 11B also illustrate vectors Ha, Hb and Hex. The directions of the vectors Ha, Hb, and Hex represent the directions of the first partial magnetic field MFa, the second partial magnetic field MFb, and the noise magnetic field Mex, respectively. The magnitudes of the vectors Ha, Hb, and Hex represent the strengths of the first partial magnetic field MFa, the second partial magnetic field MFb, and the noise magnetic field Mex, respectively. In FIG. 11A and FIG. 11B the magnitude of the vector Hex is exaggerated.

The first composite magnetic field MF1 is a composite magnetic field of the first partial magnetic field MFa and the noise magnetic field Mex. Thus, the first vector H1 is expressible by the following Eq. (18) using the vectors Ha and Hex.

$$H1=Ha+Hex \quad (18)$$

The second composite magnetic field MF2 is a composite magnetic field of the second partial magnetic field MFb and the noise magnetic field Mex. Thus, the second vector H2 is expressible by the following Eq. (19) using the vectors Hb and Hex.

$$H2=Hb+Hex \quad (19)$$

As is apparent from Eq. (18) and FIG. 11A, the direction and magnitude of the first vector H1 vary depending on the vector Hex. As is apparent from Eq. (19) and FIG. 11B, the direction and magnitude of the second vector H2 vary depending on the vector Hex. In the present embodiment, the first vector H1 represents the first composite magnetic field information, and the second vector H2 represents the second composite magnetic field information. Therefore, Eqs. (18) and (19) and FIGS. 11A and 11B indicate that the noise magnetic field Mex has an effect on each of the first composite magnetic field information and the second composite magnetic field information.

In FIGS. 11A and 11B, the magnitude of the vector Ha represents the strength of the first partial magnetic field MFa, and the magnitude of the vector Hb represents the strength of the second partial magnetic field MFb. In the present embodiment, the strength of the first partial magnetic field MFa and the strength of the second partial magnetic field MFb are different from each other. Thus, the noise magnetic field Mex has different relative effects on the first composite magnetic field information and the second composite magnetic field information. This may result in a difference dependent on the noise magnetic field Mex between the first composite magnetic field information and the second composite magnetic field information. To be more specific, differences dependent on the noise magnetic field Mex result between the first vector H1 and the second vector H2 in direction and magnitude. Using this characteristic, the present embodiment generates the detected angle value θs in the following manner so that the effect of the noise magnetic field Mex is eliminated. First, substituting Eqs. (18) and (19) into Eq. (9) yields the following Eq. (20).

$$H3=H1-H2$$

$$=Ha+Hex-(Hb+Hex)$$

$$=Ha-Hb \quad (20)$$

As is apparent from Eq. (20), performing the operation to obtain the difference between the first vector H1 and the second vector H2 cancels out the vector Hex to generate the third vector H3 having the same direction as the vectors Ha and Hb. Thus, in the present embodiment, the third vector H3 is generated by performing the operation using the first composite magnetic field information and the second composite magnetic field information, more specifically, the operation to obtain the difference between the first vector H1 and the second vector H2, and the detected angle value θs is generated by obtaining the direction of the third vector H3, that is, the third direction.

Each of the angles $\theta_1$ and $\theta_2$ corresponds to the detected angle value θs that is generated on the basis of either and only one of the first composite magnetic field information and the second composite magnetic field information. As has been described in relation to the first embodiment, the angles $\theta_1$ and $\theta_2$ contain the angular errors caused by the noise magnetic field Mex. On the other hand, since the third vector H3 is represented as the difference between the vectors Ha and Hb as is apparent from Eq. (20), the detected angle value θs generated in the above-described manner theoretically contains no angular error caused by the noise magnetic field Mex. The present embodiment thus enables generation of the detected angle value θs in which the angular error caused by the noise magnetic field Mex is made smaller than in the angles $\theta_1$ and $\theta_2$.

The other configuration, function and effects of the second embodiment are the same as those of the first embodiment.

Third Embodiment

A third embodiment of the present invention will now be described. First, reference is made to FIG. 12 to describe the configuration of the angle sensor 1 according to the third embodiment. The angle sensor 1 according to the third embodiment is different from the angle sensor 1 according to the second embodiment in the following ways. In the third embodiment, the first and second vector generation units 16 and 26 of the second embodiment are omitted. Further, the angle sensor 1 according to the third embodiment includes an angle computing unit 230 in place of the angle computing unit 130 of the second embodiment. The angle computing unit 230 can be implemented by an ASIC or a microcomputer, for example.

Like the angle computing unit 130, the angle computing unit 230 performs the operation to obtain the difference between the first vector H1 and the second vector H2 as the operation using the plurality of pieces of composite magnetic field information, and thereby determines the third vector H3 defined in relation to the second embodiment. The angle computing unit 230 generates the detected angle value θs by determining the third direction of the third vector H3.

In the present embodiment, the first and second detection signals S1 and S2 are assumed to be two components of the first vector H1 in an orthogonal coordinate system, and the third and fourth detection signals S3 and S4 are assumed to be two components of the second vector H2 in the orthogonal coordinate system. In such a situation, it is necessary to use the first to fourth detection signal generation units 11, 12, 21 and 22 under the condition that the magnitudes of the first to fourth detection signals S1 to S4 do not become saturated within the range of the strengths of the first and second composite magnetic fields MF1 and MF2.

Figure 12:
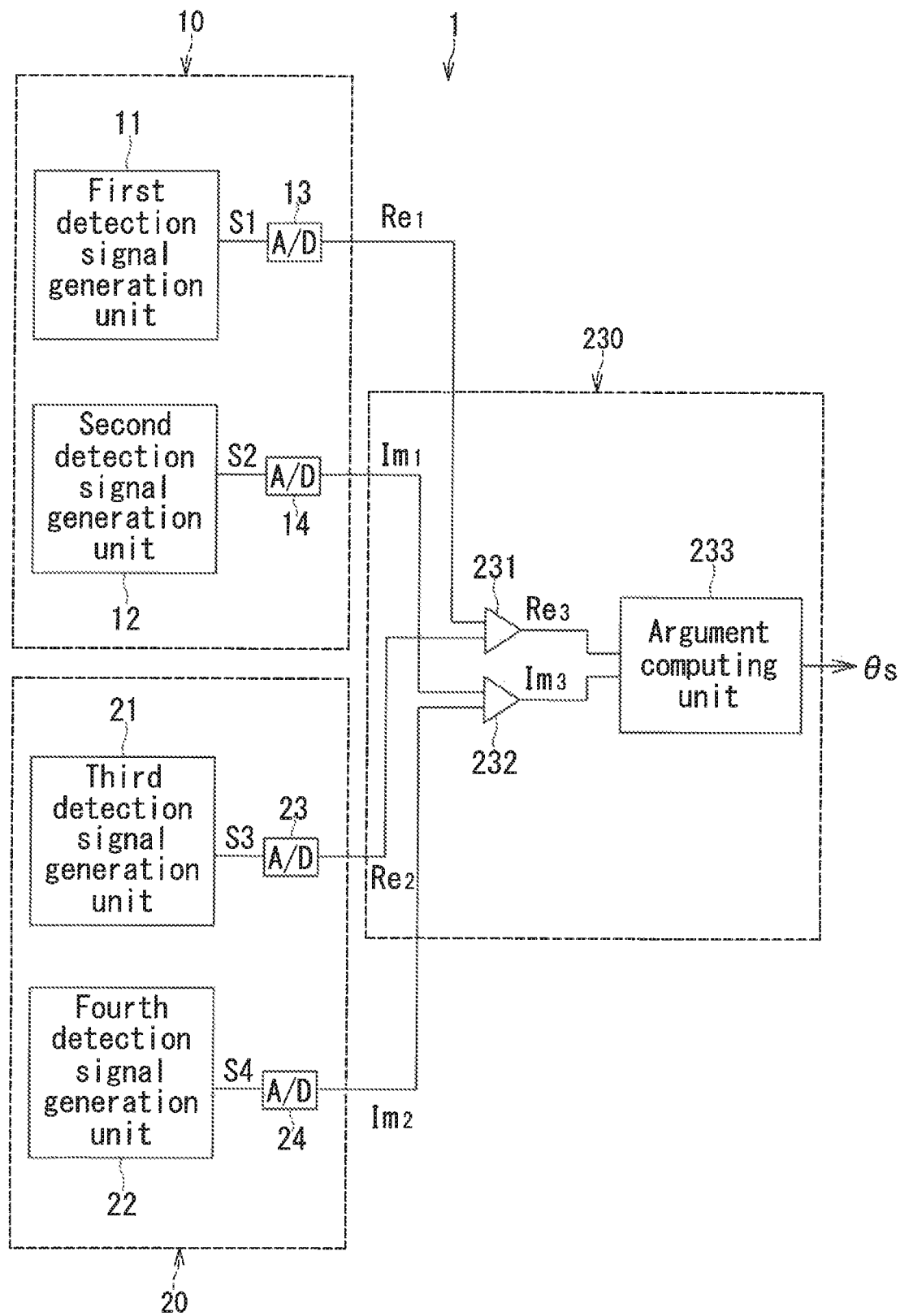
FIG. 12 is a block diagram illustrating the configuration of an angle sensor according to a third embodiment of the invention.

In the present embodiment, the angle computing unit 230 performs operations using complex numbers, as does the angle computing unit 130. FIG. 12 illustrates an example configuration of the angle computing unit 230. In this example, the angle computing unit 230 includes a first computing unit 231, a second computing unit 232, and an argument computing unit 233. The angle computing unit 230 uses the two components of the first vector H1 in the orthogonal coordinate system as the real part $Re_1$ and the imaginary part $Im_1$ of a complex number C1, and uses the two components of the second vector H2 in the orthogonal coordinate system as the real part $Re_e$ and the imaginary part Im$_2$ of a complex number C2. To be more specific, the first and second detection signals S1 and S2 which have been converted into digital signals by the A/D converters 13 and 14 are used as the real part Re$_1$ and the imaginary part Im$_1$ of the complex number C1; and the third and fourth detection signals S3 and S4 which have been converted into digital signals by the A/D converters 23 and 24 are used as the real part Re$_2$ and the imaginary part Im$_2$ of the complex number C2. The operation to obtain the difference between the complex number C1 and the complex number C2 corresponds to the operation to obtain the difference between the first vector H1 and the second vector H2.

The first computing unit 231 performs an operation to obtain the difference between the real part Re$_1$ of the complex number C1 and the real part Re$_2$ of the complex number C2 to thereby determine the real part Re$_3$ of the complex number C3 defined in relation to the second embodiment. The second computing unit 232 performs an operation to obtain the difference between the imaginary part Im$_1$ of the complex number C1 and the imaginary part Im$_2$ of the complex number C2 to thereby determine the imaginary part Im$_3$ of the complex number C3. The real part Re$_3$ and the imaginary part Im$_3$ are respectively expressed by Eqs. (15) and (16) of the second embodiment.

The argument of the complex number C3 corresponds to the third direction of the third vector H3. In the present embodiment, the argument of the complex number C3 is assumed to be the detected angle value θs. The argument computing unit 233 obtains the argument of the complex number C3 to calculate the detected angle value θs. The calculation method for the detected angle value θs is the same as that in the second embodiment.

According to the present embodiment, the first and second detection signals S1 and S2 are directly used as the real part Re$_1$ and the imaginary part Im$_1$ of the complex number C1, and the third and fourth detection signals S3 and S4 are directly used as the real part Re$_2$ and the imaginary part Im$_2$ of the complex number C2. The present embodiment thus eliminates the need for the operations for determining the first and second directions D$_1$ and D$_2$, the first and second magnitudes A$_1$ and A$_2$, the real parts Re$_1$ and Re$_e$, and the imaginary parts Im$_1$ and Im$_2$ described in relation to the second embodiment. This makes it easier to generate the detected angle value θs and allows the angle sensor 1 to be simpler in configuration when compared with the second embodiment.

The other configuration, function and effects of the third embodiment are the same as those of the second embodiment.

The present invention is not limited to the foregoing embodiments, and various modifications may be made thereto. For example, each of the plurality of composite magnetic field information generation units in the present invention may include a part that generates information on only the direction of a composite magnetic field in the same manner as the first and second composite magnetic field information generation units 10 and 20 of the first embodiment, and another part that generates information on only the strength of the composite magnetic field.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. An angle sensor system comprising:
    an angle sensor for generating a detected angle value having a correspondence with an angle to be detected; and
    a magnetic field generation unit for generating a magnetic field to be detected, wherein
    the angle sensor includes:
        a plurality of composite magnetic field information generation units for detecting, at a plurality of detection positions different from each other, a composite magnetic field of the magnetic field to be detected and a noise magnetic field other than the magnetic field to be detected, and thereby generating a plurality of pieces of composite magnetic field information including information on at least the direction, out of the direction and the strength, of the composite magnetic field; and
        an angle computing unit for generating the detected angle value,
    the magnetic field generation unit and the plurality of composite magnetic field information generation units are configured so that the magnetic field to be detected is in the same direction at the plurality of detection positions, but has different strengths at the plurality of detection positions,
    at each of the plurality of detection positions, the magnetic field to be detected varies its direction according to the angle to be detected, and
    the angle computing unit generates the detected angle value by performing an operation using the plurality of pieces of composite magnetic field information so that an error of the detected angle value caused by the noise magnetic field is made smaller than in a case where the detected angle value is generated on the basis of only one of the plurality of pieces of composite magnetic field information.

2. The angle sensor system according to claim 1, wherein each of the plurality of composite magnetic field information generation units includes two detection signal generation units for generating two detection signals indicative of strengths of two components of the composite magnetic field that are in mutually different directions, and each of the plurality of pieces of composite magnetic field information is generated on the basis of the two detection signals.

3. The angle sensor system according to claim 2, wherein the two components of the composite magnetic field are in mutually orthogonal directions.

4. The angle sensor system according to claim 2, wherein each of the two detection signal generation units includes at least one magnetic detection element.

5. The angle sensor system according to claim 1, wherein the plurality of composite magnetic field information generation units are disposed at mutually different distances from the magnetic field generation unit.

6. The angle sensor system according to claim 5, wherein the plurality of composite magnetic field information generation units are disposed at mutually different positions on an imaginary straight line passing through the magnetic field generation unit.

7. The angle sensor system according to claim 1, wherein the plurality of detection positions are a first detection position and a second detection position,
    the plurality of pieces of composite magnetic field information are first composite magnetic field information and second composite magnetic field information, the first composite magnetic field information including information on at least the direction, out of the direction and the strength, of the composite magnetic field at the first detection position, the second composite magnetic field information including information on at least the direction, out of the direction and the strength, of the composite magnetic field at the second detection position, and the plurality of composite magnetic field information generation units are a first composite magnetic field information generation unit for generating the first composite magnetic field information, and a second composite magnetic field information generation unit for generating the second composite magnetic field information.

8. The angle sensor system according to claim 7, wherein the first composite magnetic field information is an angle $\theta_1$ that the direction of the composite magnetic field at the first detection position forms with respect to a reference direction, the second composite magnetic field information is an angle $\theta_2$ that the direction of the composite magnetic field at the second detection position forms with respect to the reference direction, and the angle computing unit performs, as the operation using the plurality of pieces of composite magnetic field information, an operation using the angles $\theta_1$ and $\theta_2$ and the ratio of the strength of the magnetic field to be detected at the first detection position to the strength of the magnetic field to be detected at the second detection position.

9. The angle sensor system according to claim 7, wherein the first composite magnetic field information is represented as a first vector having a first direction and a first magnitude, the first direction corresponds to the information on the direction of the composite magnetic field at the first detection position, the first magnitude corresponds to the information on the strength of the composite magnetic field at the first detection position, the second composite magnetic field information is represented as a second vector having a second direction and a second magnitude, the second direction corresponds to the information on the direction of the composite magnetic field at the second detection position, the second magnitude corresponds to the information on the strength of the composite magnetic field at the second detection position, and the angle computing unit performs, as the operation using the plurality of pieces of composite magnetic field information, an operation to determine a difference between the first vector and the second vector.

10. The angle sensor system according to claim 9, wherein the first composite magnetic field information generation unit includes a first detection signal generation unit for generating a first detection signal, a second detection signal generation unit for generating a second detection signal, and a first vector generation unit for generating the first vector, the first detection signal and the second detection signal being indicative of strengths of two components of the composite magnetic field at the first detection position, the two components being in mutually orthogonal directions, the first vector generation unit determines the first direction and the first magnitude on the basis of the first detection signal and the second detection signal, the second composite magnetic field information generation unit includes a third detection signal generation unit for generating a third detection signal, a fourth detection signal generation unit for generating a fourth detection signal, and a second vector generation unit for generating the second vector, the third detection signal and the fourth detection signal being indicative of strengths of two components of the composite magnetic field at the second detection position, the two components being in mutually orthogonal directions, and the second vector generation unit determines the second direction and the second magnitude on the basis of the third detection signal and the fourth detection signal.

11. The angle sensor system according to claim 9, wherein the first composite magnetic field information generation unit includes a first detection signal generation unit for generating a first detection signal, and a second detection signal generation unit for generating a second detection signal, the first detection signal and the second detection signal being indicative of strengths of two components of the composite magnetic field at the first detection position, the two components being in mutually orthogonal directions, the second composite magnetic field information generation unit includes a third detection signal generation unit for generating a third detection signal, and a fourth detection signal generation unit for generating a fourth detection signal, the third detection signal and the fourth detection signal being indicative of strengths of two components of the composite magnetic field at the second detection position, the two components being in mutually orthogonal directions, the first detection signal and the second detection signal are two components of the first vector in an orthogonal coordinate system, and the third detection signal and the fourth detection signal are two components of the second vector in the orthogonal coordinate system.

12. The angle sensor system according to claim 7, wherein the first composite magnetic field information generation unit is positioned closer to the magnetic field generation unit than the second composite magnetic field information generation unit.

13. The angle sensor system according to claim 12, wherein the first and second composite magnetic field information generation units are disposed at mutually different positions on an imaginary straight line passing through the magnetic field generation unit.

14. An angle sensor system comprising:
an angle sensor for generating a detected angle value having a correspondence with an angle to be detected; and
a magnetic field generation unit for generating a magnetic field to be detected, wherein
the angle sensor includes:
a plurality of composite magnetic field information generation units for detecting, at a plurality of detection positions different from each other, a composite magnetic field of the magnetic field to be detected and a noise magnetic field other than the magnetic field to be detected, and thereby generating a plurality of pieces of composite magnetic field information including information on at least the direction, out of the direction and the strength, of the composite magnetic field; and an angle computing unit for generating the detected angle value, the plurality of composite magnetic field information generation units are disposed at different distances from the magnetic field generation unit, at each of the plurality of detection positions, the magnetic field to be detected varies its direction according to the angle to be detected, the magnetic field to be detected has different strengths at the plurality of detection positions, and the angle computing unit generates the detected angle value by performing an operation using the plurality of pieces of composite magnetic field information so that an error of the detected angle value caused by the noise magnetic field is made smaller than in a case where the detected angle value is generated on the basis of only one of the plurality of pieces of composite magnetic field information.

15. A method of generating a detected angle value by using an angle sensor, the detected angle value having a correspondence with an angle to be detected, the angle sensor including a plurality of composite magnetic field information generation units for detecting, at a plurality of detection positions different from each other, a composite magnetic field of a magnetic field to be detected and a noise magnetic field other than the magnetic field to be detected, and thereby generating a plurality of pieces of composite magnetic field information including information on at least the direction, out of the direction and the strength, of the composite magnetic field, wherein the plurality of composite magnetic field information generation units are configured so that the magnetic field to be detected is in the same direction at the plurality of detection positions, but has different strengths at the plurality of detection positions, and at each of the plurality of detection positions, the magnetic field to be detected varies its direction according to the angle to be detected, the method comprising generating the detected angle value by performing an operation using the plurality of pieces of composite magnetic field information so that an error of the detected angle value caused by the noise magnetic field is made smaller than in a case of generating the detected angle value on the basis of only one of the plurality of pieces of composite magnetic field information.

* * * * *